United States Patent Office 3,053,229
Patented Sept. 11, 1962

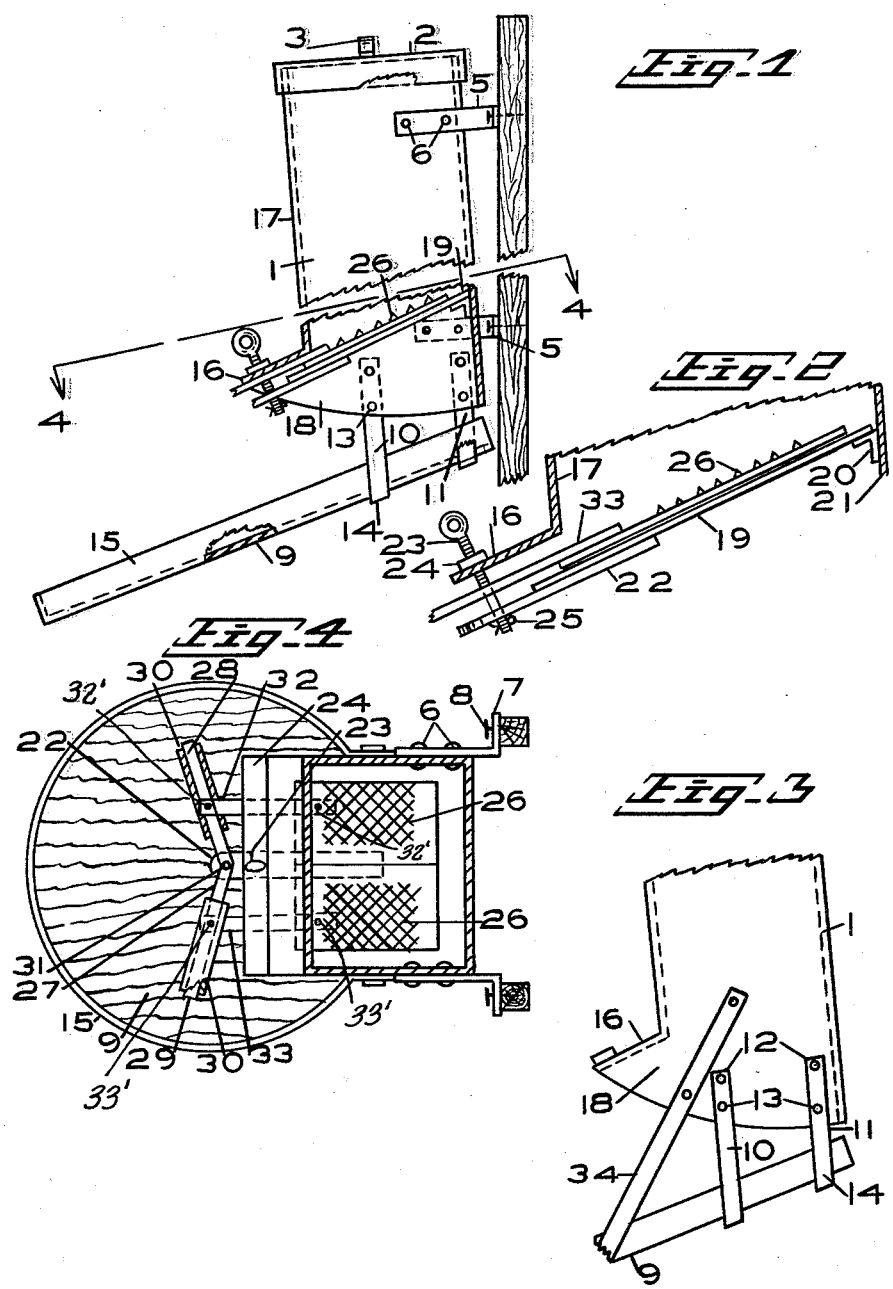

3,053,229
SALT AND POWDER DISPENSER FOR CATTLE
William John McIntyre, Swift Current,
Saskatchewan, Canada
Filed Sept. 18, 1961, Ser. No. 138,764
4 Claims. (Cl. 119—54)

This invention relates to salt and powder dispensers for cattle, and has particular reference to a dispenser having a salt and powder container and a trough suspended from the container on to which the salt and powder discharge.

In the art to which the invention relates salt and powder for cattle are more usually dispensed loose in a trough to be licked up by the animal, but in this there is no continuity of supply and the ingredients are exposed to the weather. It has also been proposed to provide a container and a trough on to which the container discharges.

The present invention is concerned with improvements in the latter kind of salt and powder dispenser, one of the objects of the invention being to provide improved means, agitated by an animal using the trough, by which a continuous supply of salt and powder from the container is discharged into the trough.

Other features and advantages of the invention will become apparent by reference to the accompanying description taken in conjunction with the drawings.

In the drawings, wherein is illustrated a preferred embodiment of the invention, FIG. 1 is a side view of a salt and powder dispenser in accordance with my invention, illustrated as attached to supporting posts, and shown in part broken away and in part sectioned, and further shown with the container discharge outlet closed.

FIG. 2 is an enlarged side view partly in vertical section of a lower portion of the container as in FIGURE 1, the side and rear walls of the container below the mounting for the screens being shown broken away.

FIG. 3 is a side view showing fragmentary portions of the container and trough, and including the supporting brackets for the trough.

FIG. 4 is a horizontal sectional view of the dispenser taken on a line 4—4 of FIGURE 1, and with a bumper arm shown with its sheath in horizontal section.

Having reference to the drawings, the dispenser includes a container 1 open at the ends and closed at the top by a cover 2 with handle 3. This container is to be mounted on two posts driven into the ground spaced apart, the container attaching to the posts by upper and lower brackets 5 on each side secured to the container by rivets 6, the brackets including end portions 7 at right angles to the bodies of the brackets and attachable to the posts by nails 8 insertable through suitable openings in the bracket end portions.

From the container is suspended a trough 9 by brackets 10 and 11 that include end portions 12 attached on each side of the container by rivets 13 and connecting body portions 14 passing under the trough, the end portions being at right angles to the connecting body portions. These brackets have their end portions of unequal length and suspend the trough depending forwardly downward. The trough preferably has a veneer bottom portion and includes an upstanding side 15 to prevent salt escaping from the trough.

The lower portion 16 of the front wall 17 of the container is turned outward and upward, inclining parallel with the bottom of the trough 9 to form an overhang, and the sides of the container extend forwardly, as at 18, to this upwardly turned portion of the front wall.

Within the container is a table 19 (FIG. 2) supported at the rear free to tilt on an angle iron bracket 20 attached to the rear wall 21 of the container. Forwardly the table 19 is carried on a bar 22 fixed to the under side of the table and engaged by an eye bolt 23 threaded in a cross bar 24 fixed on the upwardly turned portion 16 of the front wall, the bar 22 being held by a cotter pin 25 in the eye bolt.

Free to slide on the table 19 are two screens 26 that are shiftable by a lever 27 that has two arms 28 and 29 covered with protecting sleeves 30 of rubber or like cushioning material. This lever pivots on the bar 22 by a pin 31 and connects to the screens by link bars 32 and 33 that are attached to the screens and lever arms by rivets, as at 32' and 33'. These screens are of rectangular sections of wire mesh and are intended to work the salt forward by grating the lower end of the body of salt in the container, the salt being loose and in lumps, as commonly occurs, the screens serving to shave off the lumps.

In the use of the dispenser, salt discharging from the container falls off the table 19 under the overhang where it is protected from rain. An animal reaching up under the container to lick the salt pushes rearward on one or other of the lever arms 28 and 29, and this moves its attached screen back causing salt to discharge as it is moved forward by the other screen. This in turn causes the animal to reach to the side the salt has discharged from and in doing so push against the lever arm on that side, moving the screen attached to the arm back and the other screen forward.

By the arrangement herein provided a constant supply of salt is always available in the trough under the overhang at one side or the other, this including powder mixed with the salt, the powder being of a medicinal character.

The trough 9 could include a brace bar 34 to give forward support to the trough.

Having thus particularly described and ascertained the nature of my said invention, what I claim and wish to secure by Letters Patent is:

1. A salt and powder dispenser including a casing open at the lower end, a downwardly inclined table mounted in the lower end of the casing, a trough suspended from the casing inclined downwardly and on to which the table discharges, a pair of screens free to slide on the table, a lever having a pair of laterally extending arms, means mounting the lever intermediately pivotally carried by the table, and link bars pivotally connecting the lever arms to the screens.

2. A salt and powder dispenser as set out in claim 1 in which the casing has a wall portion turned upwardly outward extending over the lower end portion of the table and forming a protecting overhang.

3. In a salt and powder dispenser including a container having an open lower end and a trough suspended from the container, said container including means for rearwardly attaching the container to supporting posts, a table, means mounting the table in the lower end of the container inclining forwardly downward, the trough being mounted inclining downwardly and projecting forwardly of the table, a pair of screens free to slide on the table, a lever, means attaching the lever to the table pivoted thereto intermediate its length, said lever having laterally extending arms, and link bars attaching said arms to the screens.

4. A salt and powder dispenser as set out in claim 3 in which that portion of the container extending forwardly over the trough is turned outward forming a protecting overhang, and the supporting means for the table comprise means rearwardly supporting the table in the container free to tilt vertically and means forwardly supporting the table from said overhang, said forward supporting means being adjustable to vary the spacing between the table and overhang.

References Cited in the file of this patent

UNITED STATES PATENTS

| | | |
|---|---|---|
| 1,325,922 | Aske | Dec. 23, 1919 |
| 2,037,248 | Longhridge | April 14, 1936 |
| 2,570,640 | Carmo | Oct. 9, 1951 |
| 2,997,981 | Siggins | Aug. 29, 1961 |